(12) United States Patent
Durham et al.

(10) Patent No.: US 7,844,690 B1
(45) Date of Patent: Nov. 30, 2010

(54) SYSTEMS AND METHODS FOR CREATION AND USE OF A VIRTUAL PROTOCOL ANALYZER

(76) Inventors: Douglas Durham, 1788 Lark La., Sunnyvale, CA (US) 94087; John Arrington, 2223 Pullman Ave., Belmont, CA (US) 94002; Dominic Coupal, 1700 Halford Ave., Apt. 325, Santa Clara, CA (US) 95051

( * ) Notice: Subject to any disclaimer, the term of this patent is extended or adjusted under 35 U.S.C. 154(b) by 1505 days.

(21) Appl. No.: 10/764,059

(22) Filed: Jan. 23, 2004

Related U.S. Application Data

(60) Provisional application No. 60/442,277, filed on Jan. 24, 2003.

(51) Int. Cl.
*G06F 15/173* (2006.01)
(52) U.S. Cl. ...................................... 709/223; 709/220
(58) Field of Classification Search ......... 709/223–224, 709/200, 220
See application file for complete search history.

(56) References Cited

U.S. PATENT DOCUMENTS

| | | | | |
|---|---|---|---|---|
| 5,373,501 A | * | 12/1994 | Roland | 370/250 |
| 5,535,193 A | | 7/1996 | Zhang | |
| 5,590,116 A | | 12/1996 | Zhang | |
| 5,748,098 A | | 5/1998 | Grace | |
| 5,850,388 A | | 12/1998 | Anderson et al. | |
| 5,889,954 A | * | 3/1999 | Gessel et al. | 709/223 |
| 5,896,427 A | | 4/1999 | Muntz et al. | |
| 5,920,711 A | * | 7/1999 | Seawright et al. | 703/15 |
| 5,982,753 A | * | 11/1999 | Pendleton et al. | 370/252 |
| 6,005,696 A | * | 12/1999 | Joline et al. | 398/25 |
| 6,070,248 A | | 5/2000 | Yu et al. | |
| 6,125,404 A | | 9/2000 | Vaglica et al. | |
| 6,148,420 A | | 11/2000 | Schlater et al. | |
| 6,269,136 B1 | | 7/2001 | Hansen et al. | |
| 6,335,931 B1 | | 1/2002 | Strong et al. | |
| 6,370,159 B1 | | 4/2002 | Eidson | |
| 6,507,923 B1 | * | 1/2003 | Wall et al. | 714/712 |
| 6,526,044 B1 | * | 2/2003 | Cookmeyer et al. | 370/352 |
| 6,665,316 B1 | | 12/2003 | Eidson | |
| 6,674,724 B1 | * | 1/2004 | Main et al. | 370/241 |
| 6,707,794 B1 | | 3/2004 | Leong et al. | |
| 6,728,219 B1 | * | 4/2004 | Leong et al. | 370/252 |
| 6,931,574 B1 | * | 8/2005 | Coupal et al. | 714/39 |
| 7,003,781 B1 | | 2/2006 | Blackwell | |

(Continued)

OTHER PUBLICATIONS

U.S. Appl. No. 10/764,218, filed Apr. 16, 2008, Office Action.

(Continued)

*Primary Examiner*—Faruk Hamza

(57) ABSTRACT

Systems and methods are provided for facilitating analysis of a communications system through the use of a multi-protocol communications analyzer. A graphical user interface employed in connection with the multi-protocol communications analyzer enables a user to create a new domain, or modify an existing domain, that includes a list of ports selected by the user, where each port is associated with a particular communication link of the communications system. The ports are selected from a list of available ports displayed by the graphical user interface. The ports selected for inclusion in the domain can then be configured, by way of the graphical user interface, as desired. After the domain has been defined, the domain can then be used to analyze one or more of the links associated with the ports included in the domain.

19 Claims, 7 Drawing Sheets

U.S. PATENT DOCUMENTS

| | | |
|---|---|---|
| 7,042,908 B1 | 5/2006 | Mayer |
| 7,133,416 B1 | 11/2006 | Chamdani et al. |
| 7,173,943 B1 | 2/2007 | Borchew et al. |
| 7,228,348 B1 * | 6/2007 | Farley et al. .................. 709/224 |
| 7,257,736 B2 * | 8/2007 | Dunn et al. .................... 714/39 |
| 7,610,516 B2 * | 10/2009 | Siu ............................. 714/45 |
| 7,630,385 B2 * | 12/2009 | Oyadomari et al. ......... 370/400 |
| 2002/0133588 A1 * | 9/2002 | Doyle et al. ................. 709/224 |
| 2002/0136232 A1 | 9/2002 | Dudziak |
| 2002/0194393 A1 | 12/2002 | Hrischuk et al. |
| 2003/0074440 A1 | 4/2003 | Grabarnik et al. |
| 2004/0049706 A1 | 3/2004 | Strong |
| 2004/0054776 A1 * | 3/2004 | Klotz et al. ................. 709/224 |
| 2004/0233910 A1 | 11/2004 | Chen et al. |
| 2005/0060402 A1 * | 3/2005 | Oyadomari et al. ......... 709/224 |

OTHER PUBLICATIONS

U.S. Appl. No. 10/764,095, filed Aug. 9, 2007, Office Action.
U.S. Appl. No. 10/764,095, filed Apr. 16, 2008, Office Action.
U.S. Appl. No. 10/764,218, filed Dec. 2, 2008, Office Action.
U.S. Appl. No. 10/764,218, filed Jun. 18, 2009, Office Action.
U.S. Appl. No. 10/764,218, filed Feb. 17, 2010, Office Action.
U.S. Appl. No. 10/764,095, filed Jan. 9, 2008, Terminal Disclaimer.
U.S. Appl. No. 10/764,095, filed Dec. 24, 2008, Restriction Requirement.
U.S. Appl. No. 10/764,095, filed Apr. 14, 2009, Office Action.
U.S. Appl. No. 10/764,095, filed Nov. 27, 2009, Office Action.

* cited by examiner

SYSTEMS AND METHODS FOR CREATION AND USE OF A VIRTUAL PROTOCOL ANALYZER

RELATED APPLICATIONS

This application claims the benefit of U.S. Provisional Patent Application Ser. No. 60/442,277, entitled DETECTION AND USER SELECTION OF PROTOCOL HARDWARE TYPES filed on Jan. 24, 2003, and incorporated herein in its entirety by this reference.

BACKGROUND OF THE INVENTION

1. The Field of the Invention

The present invention relates to the identification, capture and analysis of data transmitted over a communications system. More specifically, embodiments of the present invention are concerned with the definition and use of a virtual protocol analyzer.

2. Related Technology

Many data communications systems use a variety of different data transmission mechanisms to enable communication between and among associated subsystems. In general, the type of data transmission mechanism employed in a given situation is determined with reference to the particular tasks desired to be accomplished in connection with that transmission mechanism and associated systems. Each different transmission mechanism, in turn, is associated with a particular transmission, or communication, protocol that defines various parameters concerning the transmission of data in connection with the transmission mechanism. Such communication protocols commonly specify, for example, the manner in which data is encoded onto a transmission signal, the particular physical transmission media to be used with the transmission mechanism, link layers and other attributes.

As suggested above, a single data communications system may use multiple different transmission mechanisms and protocols. As an example, an enterprise may employ a communications system that uses five different data communication protocols, each adapted for a particular situation, wherein the five protocols may include: a first protocol for a high speed, inexpensive short-haul connection on the computer motherboard; a second high-bandwidth protocol for data center transmissions; a third protocol that is suited for efficiently transmitting information across the enterprise local area network ("LAN"); a fourth protocol adapted for high bandwidth, long haul applications; and, finally, a fifth communication protocol suited for data transmission to high performance disk drive storage systems. Thus, the typical communications system comprises a patchwork of different subsystems and associated communications protocols.

In this way, a communications system can be created that makes maximum and efficient use of the functionalities and capabilities associated with various different communications protocols. Further, advances in communications technology, coupled with declining costs, enable such communications systems to be implemented in a relatively cost effective fashion.

While communications systems that include components, devices and subsystems of varying protocols are able to exploit the respective strengths and useful features associated with each of the protocols, such multiple protocol systems can be problematic in practice. This is especially true where problem identification, analysis and resolution are concerned. In particular, the use of multiple communications protocols within the bounds of a single communications system greatly complicates the performance of such processes.

For example, as network data moves from a point of origin to a destination, by way of communication links, or simply "links," the data passes through a variety of devices collectively representing multiple protocols. Typically, each such device modifies the network data so that the data can be transmitted by way of a particular link. However, modification of the data in this way often causes errors or other problems with the data. Such errors may occur as the result of various other processes and conditions as well. Thus, the various communication links in a communications system are particularly prone to introduce, or contribute to the introduction of, data errors. Moreover, data errors and other problems present at one location in the data stream may cause errors or other problems to occur at other locations in the data stream and/or at other points in the communications system and associated links.

One approach to problem identification, analysis and resolution in communications systems involves capturing a portion of the network data traffic. The captured data can then be retrieved for review and analysis. In some cases, such data capture is performed in connection with a protocol analyzer that includes various hardware and software elements configured and arranged to capture data from one or more communications links in the communications system, and to present the captured data by way of a graphical user interface.

Generally, such protocol analyzers, or simply "analyzers," capture data traffic in the communications system over a defined period of time, or in connection with the occurrence of predefined events. Use of the analyzer thus allows a network administrator to track the progress of selected data as that data moves across the various links in the communications system. Corrupted or altered data can then be identified and traced to the problem link(s), or other parts of the communications system. As discussed below, such protocol analyzers can provide useful results, but it is often the case that employment of typical protocol analyzers imposes unacceptable costs in terms of communications system performance and down time.

A typical protocol analyzer includes two or more ports configured and arranged to capture data on a communications link of a communications system. For high speed serial networks, two ports are needed to capture data on a bi-directional communications link. The two ports are sometimes referred to as a "port pair." Typically, the user connects the ports in-line with the communications link and then sets up triggering criteria to be used as a basis for the capture of data passing through the communications link.

In some cases, protocol analyzers may have as many as 64 ports capable of capturing data, and the protocol analyzer may be capable of capturing data conforming with any of a variety of communications protocols. Typically, the ports of protocol analyzers have a native communications protocol, which corresponds to the data that the analyzer port is designed to monitor and capture. Examples of such protocols are Gigabit Ethernet, Fibre Channel, and Infiniband. The ports in such protocol analyzers can be configured in a variety of ways. For example, the ports in the aforementioned 64 port protocol analyzer can be combined to create a single instrument having 32 port pairs. Alternatively, the ports can be configured into 32 different port pair instruments for use by 32 different users.

A significant problem with typical protocol analyzers however, is that if a network administrator or other user wishes to instrument a communications link for data capture and/or evaluation, the communications link must be broken and reconnected with the protocol analyzer. This is problematic at least because the process of breaking links significantly disrupts the operation of the communications system and increases communications system down time. The fact that users of conventional protocol analyzers are often required to break multiple communication links each time a different set of links is to be monitored further aggravates this problem.

In view of the foregoing, and other, problems in the art, what is needed are systems and methods for enabling a user to define and implement multiple virtual protocol analyzers, each of which may include a different combination of ports, within a single device. Such systems and methods should also allow the user to readily reconfigure a virtual protocol analyzer. Finally, exemplary embodiments of the invention should contribute to a relative reduction in the need to break communication links once the communication links have been initially instrumented.

BRIEF SUMMARY OF AN EXEMPLARY EMBODIMENT OF THE INVENTION

Generally, embodiments of the present invention are concerned with systems and methods for definition and use of virtual protocol analyzers in a communications system. In one exemplary implementation, a graphical user interface is provided for use in connection with a multi-protocol communications analyzer and enables a user to create a new domain, or modify an existing domain, that includes a list of ports selected by the user, where each port is associated with a particular communication link of the communications system. As used herein, "domain" refers to a combination of port pairs that collectively define the scope of application of a particular virtual instrument.

In operation, a user identifies the name of a domain that is to be created or modified for use in connection with the communications system. If a new domain is to be created, for example, the user then selects one or more ports from a list of available ports displayed by the graphical user interface. The selected ports are then associated with the new domain. Upon selection of the ports, the user can then set parameters for one, some or all of the ports according to various predefined options presented in connection with the graphical user interface. After the domain has been defined and the ports of the domain configured, the domain can then be used to analyze one or more of the links associated with the ports included in the domain.

In this way, multiple users are able to use a protocol analyzer and associated graphical user interface to define a variety of customized domains, employing different combinations of ports, configured to enable evaluation and resolution of particular problems. Further, once the communication links have been initially instrumented, the definition and implementation of such domains can be accomplished without necessitating frequent physical disruption of the communication links in the communications system under test. These, and other, aspects of exemplary embodiments of the invention will become more fully apparent from the following description and appended claims.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only exemplary embodiments of the invention and are not, therefore intended to be considered limiting of its scope, the invention will be described and explained with additional specificity and detail through the use of the accompanying drawings in which.

DETAILED DESCRIPTION OF EXEMPLARY EMBODIMENTS OF THE INVENTION

Generally, embodiments of the present invention are concerned with systems and methods for definition and use of virtual protocol analyzers in a communications system. Such virtual protocol analyzers may also referred to herein as a "domain." As disclosed herein, the user of the protocol analyzer is presented with a graphical user interface that enables the user to modify an existing domain or define a new domain by selecting from a list of available ports of a protocol analyzer. The domain thus encompasses a set of communication links from which data can be captured for analysis.

In this manner, the network administrator or other users can readily define and modify any number of domains for use in network traffic capture and analysis. Moreover, the definition and use of such domains can be accomplished with minimal disruption to communications system operations.

I. Exemplary Operating Environment

Figure 1:
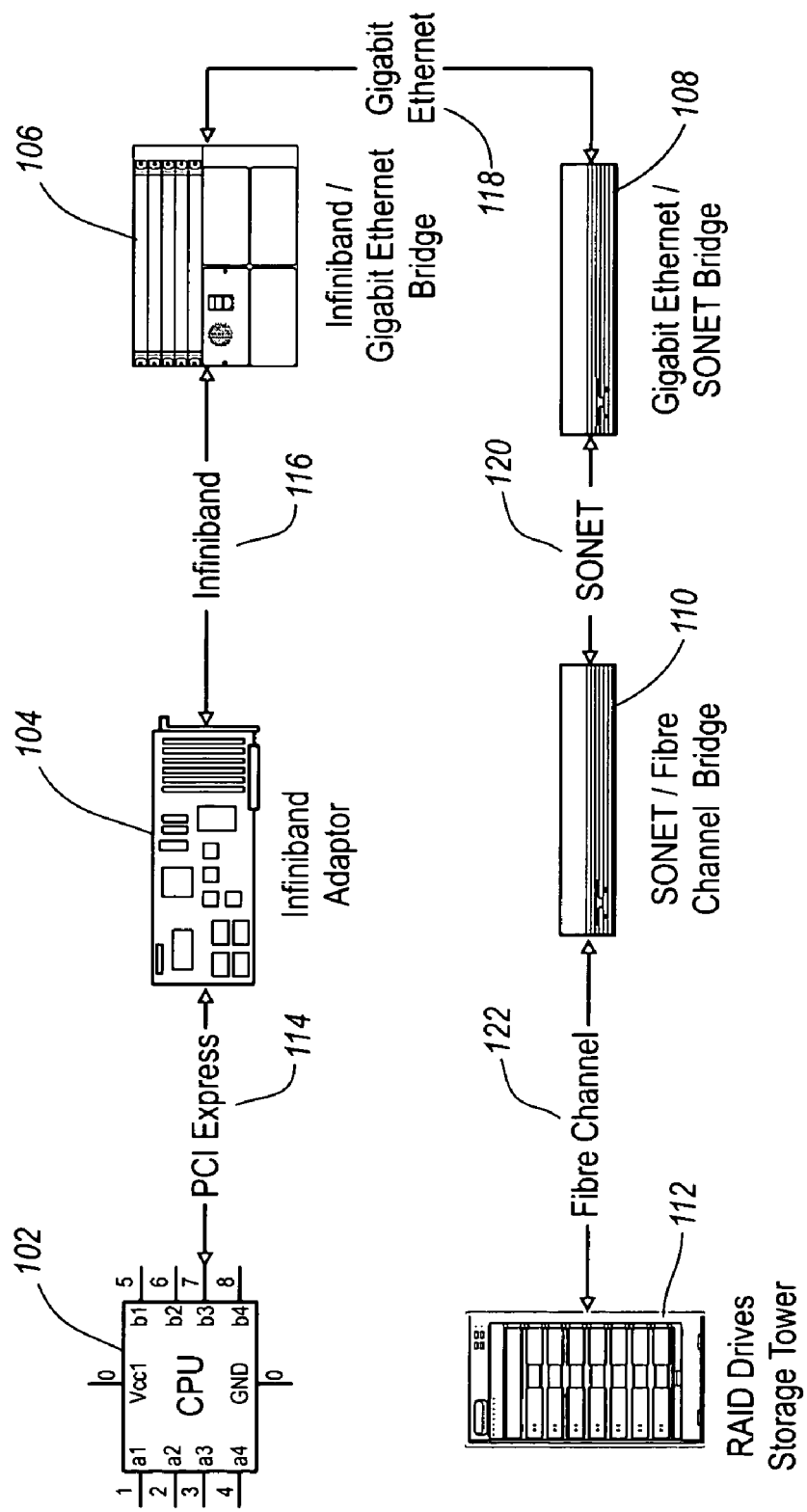
FIG. 1 is a schematic diagram that illustrates aspects of an exemplary data communications system that employs a variety of different data transmission mechanisms and protocols.

With attention now to FIG. 1, details are provided concerning an exemplary operating environment wherein the systems and methods disclosed herein may be employed. In the illustrated arrangement, the operating environment takes the form of a communications system 100 wherein data is transferred between a central processing unit ("CPU") of a computing device and a redundant array of independent disks ("RAID") system. The illustrated communications system 100 is an exemplary operating environment only however and the systems and methods disclosed herein may, more generally, be employed in any other operating environment(s) where such functionality may prove useful.

In the illustrated arrangement, the communications system 100 includes a CPU 102 of a computing device (not shown) configured and arranged for serial communication with an Infiniband adapter 104, an Infiniband/GigE bridge 106, a GigE/synchronous optical network ("SONET") bridge 108, a SONET/Fibre Channel bridge 110, and a RAID drive storage tower 112. Serial connections between these components are provided by a series of communications links. In particular, the CPU 102 and Infiniband adapter 104 are connected by a peripheral component interconnect ("PCI") Express link 114. Downstream of the Infiniband adapter 104, an Infiniband link 116 connects the Infiniband adapter 104 with the Infiniband/GigE bridge 106. In similar fashion, a GigE link 118 connects the Infiniband/GigE bridge 106 with the GigE/SONET bridge 108, while the SONET link 120 connects the GigE/SONET bridge 108 with the SONET/Fibre Channel bridge 110. Finally, a Fibre Channel link 122 connects the SONET/Fibre Channel bridge 110 with the RAID drive storage tower 112.

Each of the aforementioned links conforms with a protocol that has particular strengths and functionality that make the link well suited for use in particular environments. For example, the PCI Express link 114 comprises a high speed, inexpensive short-haul connection, while the Infiniband link 116 employs a high-<bandwidth protocol that is useful in data center transmissions. Further, where it is desired to transmit data across an enterprise LAN, the GigE link 118 is quite effective. The SONET link 120 is particularly well adapted for high bandwidth, long haul applications. Finally, the Fibre Channel link 122 enables data transmission to high performance disk drive storage systems such as the RAID drive storage tower 112.

As the foregoing suggests, the communications system 100, as well as other operating environments, comprises a variety of different communications links, systems and devices conforming with any number of communications protocols. Such arrangements are useful because they enable users to more fully exploit the relative strengths of the various communications protocols.

Figure 2:
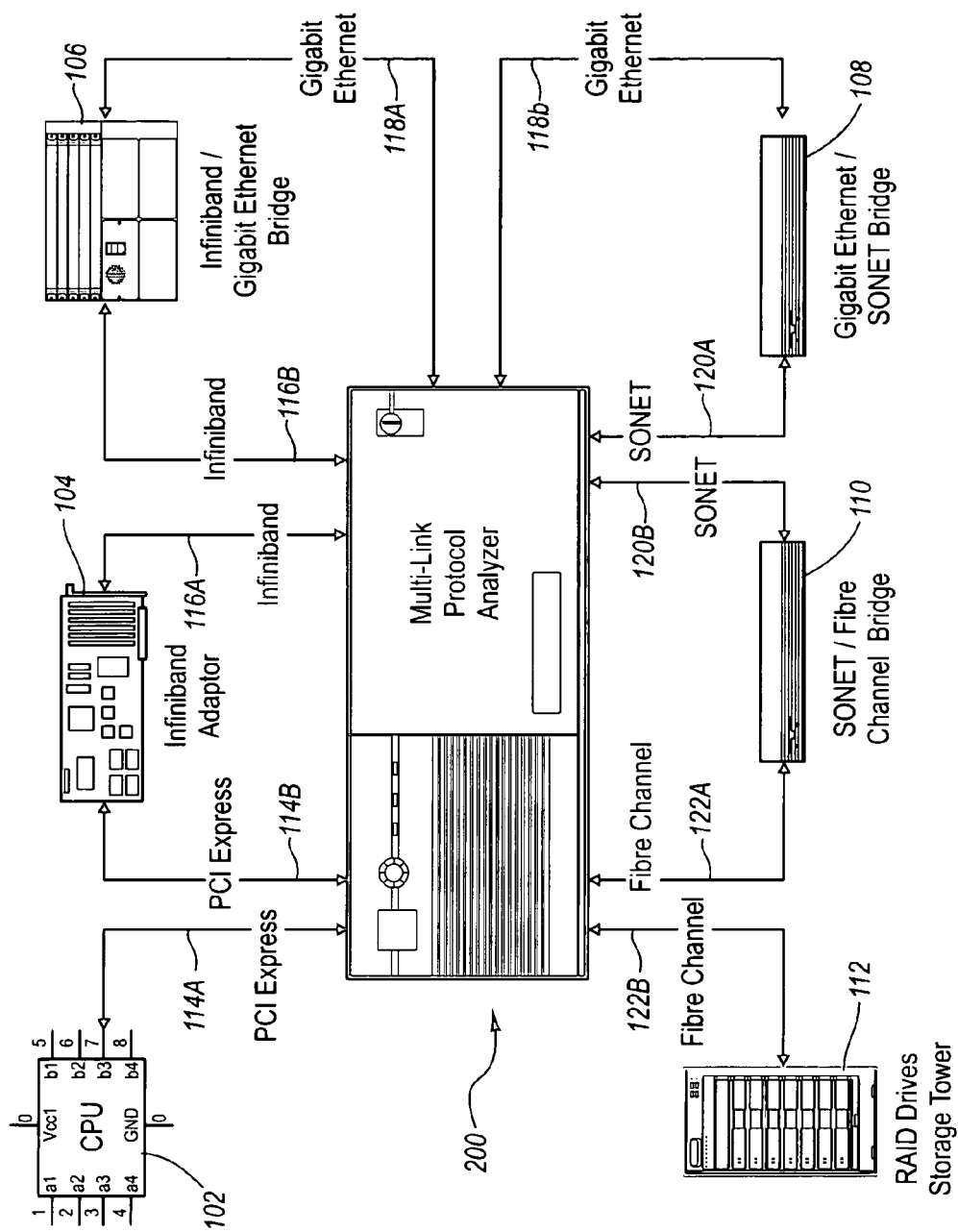
FIG. 2 is a high level schematic diagram of a protocol analyzer such as may be employed in connection with a communications system.

Directing attention now to FIG. 2, details are provided concerning a protocol analyzer, or simply "analyzer," 200 suitable for use in connection with the communications system 100, or other operating environment. As indicated in FIG. 2, the protocol analyzer 200 is disposed in an in-line arrangement with respect to each of the components in the communications system 100. In particular, the PCI Express links 114A and 114B enable routing of data from the CPU 102 through the analyzer 200 to the Infiniband adapter 104. As suggested in FIG. 2, the Infiniband links 116A and 116B, GigE links 118A and 118B, SONET links 120A and 120B, and Fibre Channel links 122A and 122B likewise enable routing of data through the analyzer 200 and on to the next link in the series.

Thus arranged, the protocol analyzer 200 receives data traffic from each of the links in the communications system. The illustrated arrangement is exemplary only however and is not intended to limit the scope of the invention. For example, in some implementations, the protocol analyzer 200 receives data from less than all the links in the communications system 100. Moreover, the protocol analyzer 200 need not be positioned in an in-line configuration in every case. Accordingly, in some implementations, the protocol analyzer 200 is configured and arranged to receive network data from a tap, or taps, on one or more of the links. More generally, the protocol analyzer 200 can be arranged in any way, relative to the communications system 100, that is consistent with the functionality disclosed herein.

II. Exemplary Protocol Analyzer Configurations

As the foregoing discussion suggests, embodiments of the protocol analyzer may be configured in a variety of different ways. With attention now to FIG. 3, details are provided concerning an exemplary link analyzer 300 design configured to implement capture of link data.

In the illustrated embodiment, the link analyzer 300 includes a serializer/deserializer ("SERDES") 302 configured to receive and transmit network traffic by way of a communications link (not shown) of a communications system. Generally, the SERDES 302 is synchronized with the transmitted clock on the input link. The link analyzer 300 further includes an analyzer front end 304 and analyzer back end 306.

Figure 3:
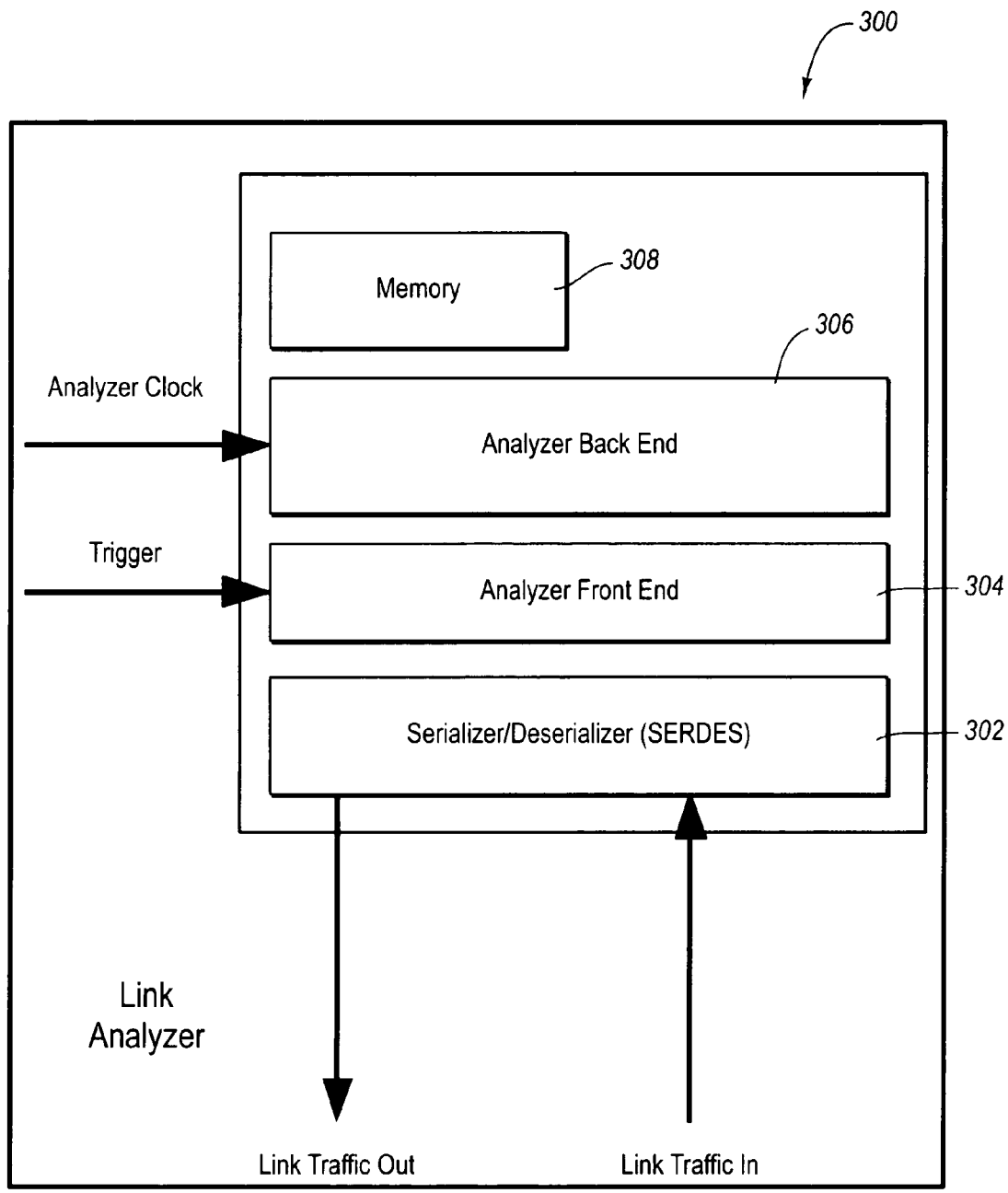
FIG. 3 is a schematic diagram of an exemplary multi-link protocol analyzer.

As indicated in FIG. 3, the analyzer front end 304 is configured to receive a "trigger" signal, such as from another analyzer. Additionally, and as disclosed elsewhere herein, the analyzer front end 304 may also generate and transmit a "trigger" signal in some cases. In similar fashion, the analyzer back end 306 is configured to receive an analyzer clock, which may also be referred to herein as a "reference clock," such as from another analyzer. As disclosed elsewhere herein, the analyzer back end 306 may also generate and transmit the analyzer clock in some cases.

Finally, the link analyzer 300 includes a memory 308. Generally, the memory 308 enables the link analyzer 300 to store captured data events and other information and materials that relate to the communications link(s) with which the link analyzer 300 is associated.

Generally, operation of the link analyzer 300 begins when the link analyzer 300 is set to "arm" and link data begins to flow through the link analyzer 300. The SERDES 302 frames the received link data into data words having a predetermined length. The framing of the data enables the internal logic of the link analyzer 300 to run at a much lower frequency than the link transmission frequency. Ultimately, the SERDES 302 also retransmits the received link data so that the data flow in the link is not interrupted.

After the SERDES 302 has framed the received link data into data words, the analyzer front end 304 examines link data words received from the SERDES 302 and compares the link data words to one or more specified patterns, or "triggers," each of which corresponds to a particular error, problem, condition or event in the link data stream and/or in the communications system. In the event that the analyzer front end 304 identifies a trigger within the incoming link data stream, the link analyzer 300 is triggered and the link data words flow from the analyzer front end 304 to the analyzer back end 306. In some implementations, such as in the case of the multi-link protocol analyzer disclosed below in connection with FIG. 4, the link analyzer 300 may also be triggered by another link analyzer in the system.

Figure 4:
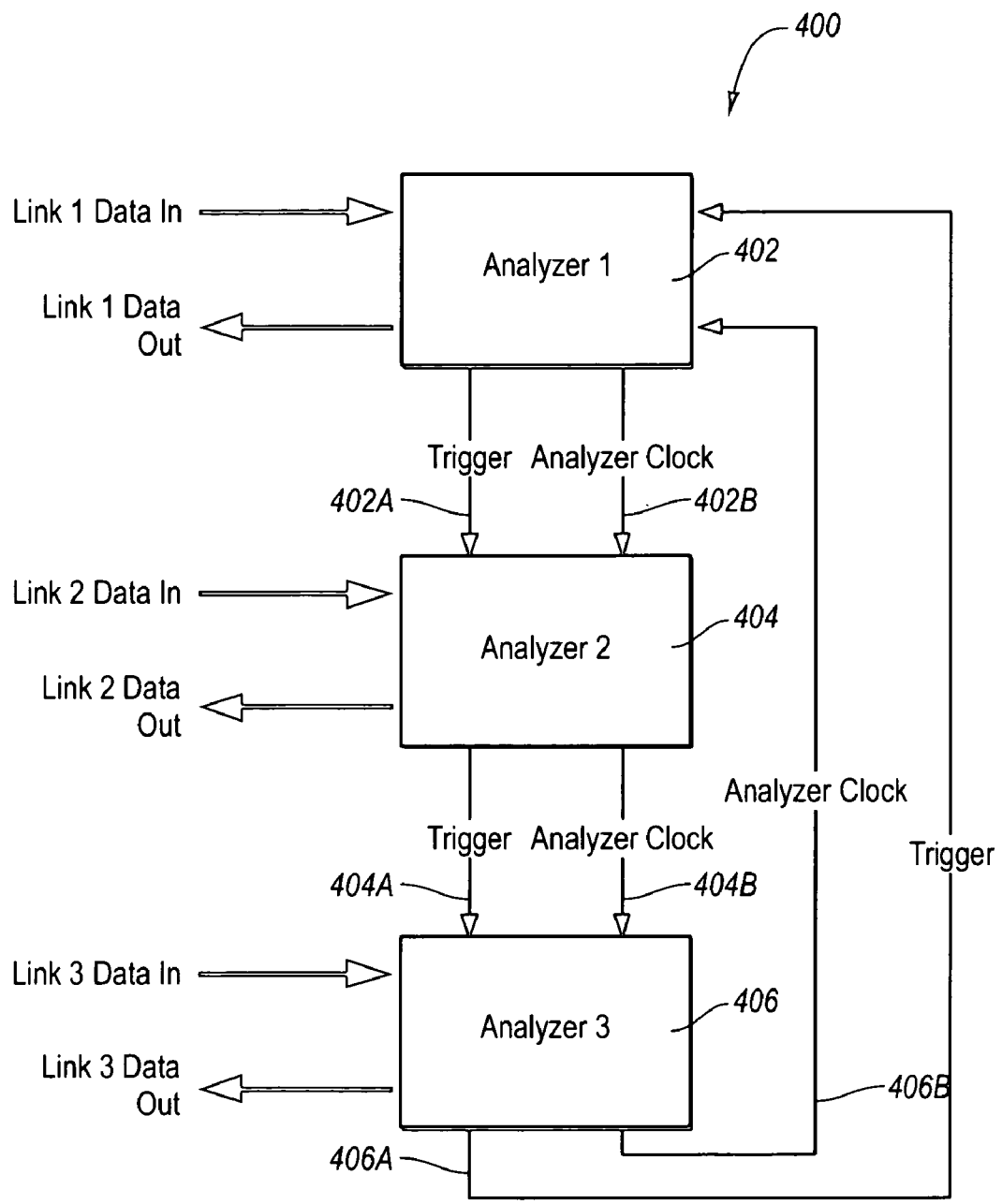
FIG. 4 is a schematic diagram illustrating relationships between a protocol analyzer and various data transmission mechanisms employed in an exemplary data communications system.

Directing attention now to FIG. 4, and with continuing reference to FIG. 3, more particular details are provided concerning an exemplary implementation of a multi-link protocol analyzer denoted generally at 400 in FIG. 4. Generally, the multi-link protocol analyzer 400 serves to monitor multiple communication links and to capture link data for use in system troubleshooting efforts and related evolutions.

To these ends, the multi-link protocol analyzer 400 includes hardware that is configured to receive and capture data events associated with a particular communication protocol. Such hardware includes one or more pairs of ports, each of which is configured and arranged to interface with a bi-directional communication link. The multiple protocol-specific devices also include hardware and/or software that is adapted to recognize the occurrence of predefined events in the data received by way of the bi-directional communication link.

As indicated in FIG. 4, the multi-link protocol analyzer 400 includes multiple link analyzers, an implementation of which is discussed above in connection with FIG. 3. Each of the link analyzers, also referred to sometimes as cards, blades or boxes, is adapted for use with a data stream corresponding to a particular protocol. In particular, each of the link analyzers is configured to capture, process and analyze data from a particular communications link with which that link analyzer is associated. The link analyzers may be modular or interchangeable so as to permit the multi-link protocol analyzer 400 to be readily modified or adapted for use with various types of communications systems.

In the particular implementation illustrated in FIG. 4, the multi-link protocol analyzer 400 includes a first link analyzer 402, a second link analyzer 404 and a third link analyzer 406 arranged in series with each other. Exemplarily, each of the link analyzers 402, 404 and 406 is configured for use in connection with a different communications protocol.

The link analyzer 402, for example, is arranged in an in-line configuration so as to receive data from a communications link "1" input, and to pass the received data to a corresponding communications link "1" output. As disclosed in further detail elsewhere herein, the received link "1" data is examined by the link analyzer 402 for the presence of one or more trigger conditions which, if detected by the link analyzer 402, cause the generation and transmission of a trigger signal 402A to the link analyzers 404 and 406. Contemporaneously with generation and transmission of the trigger signal 402A, the analyzer generates and transmits an analyzer, or reference, clock signal 402B.

As further indicated in FIG. 4, the link analyzer 402 is also configured to receive, either directly or indirectly, a trigger signal and analyzer clock signal from the link analyzer 406. The link analyzers 404 and 406 are similarly configured to transmit and receive trigger and analyzer clock signals. Further, the operation of link analyzers 404 and 406 concerning link "2" data and link "3" data, respectively, is analogous to the operation of link analyzer 402 with respect to link "1" data.

Thus, for example, in the event that the link analyzer 404 detects a trigger condition in the link "2" data, the link analyzer 404 generates and transmits trigger 404A and analyzer clock 404B. In like fashion, if the link analyzer 406 detects a trigger condition in the link "3" data, the link analyzer 406 generates and transmits trigger 406A and analyzer clock 406B.

It should be noted that while the link analyzers 402, 404 and 406 are shown in FIG. 4 as being arranged in serial fashion, the scope of the invention is not so limited. In some implementations, the link analyzers 402, 404 and 406 are arranged so that a trigger and/or clock signal generated by one link analyzer is propagated in parallel to the other link analyzers in the system.

III. Domain Creation and Modification

As disclosed herein, multiple virtual protocol analyzers, or domains, can be defined and used in connection with a multi-link protocol analyzer. The definition and use of domains enhances the flexibility of the multi-link protocol analyzer by allowing a user to set up a variety of different experiments directed to obtaining information concerning the performance of the communication links with which the multi-link protocol analyzer is connected. Further, the use of such domains enables users to readily change from one experiment to another, as well as to design and implement new experiments, without necessitating hardware reconfiguration. In at least some cases, multiple experiments may be run simultaneously, so that the resources of the multi-link protocol analyzer can be used to maximum effect and with a high degree of efficiency.

Figure 5A:
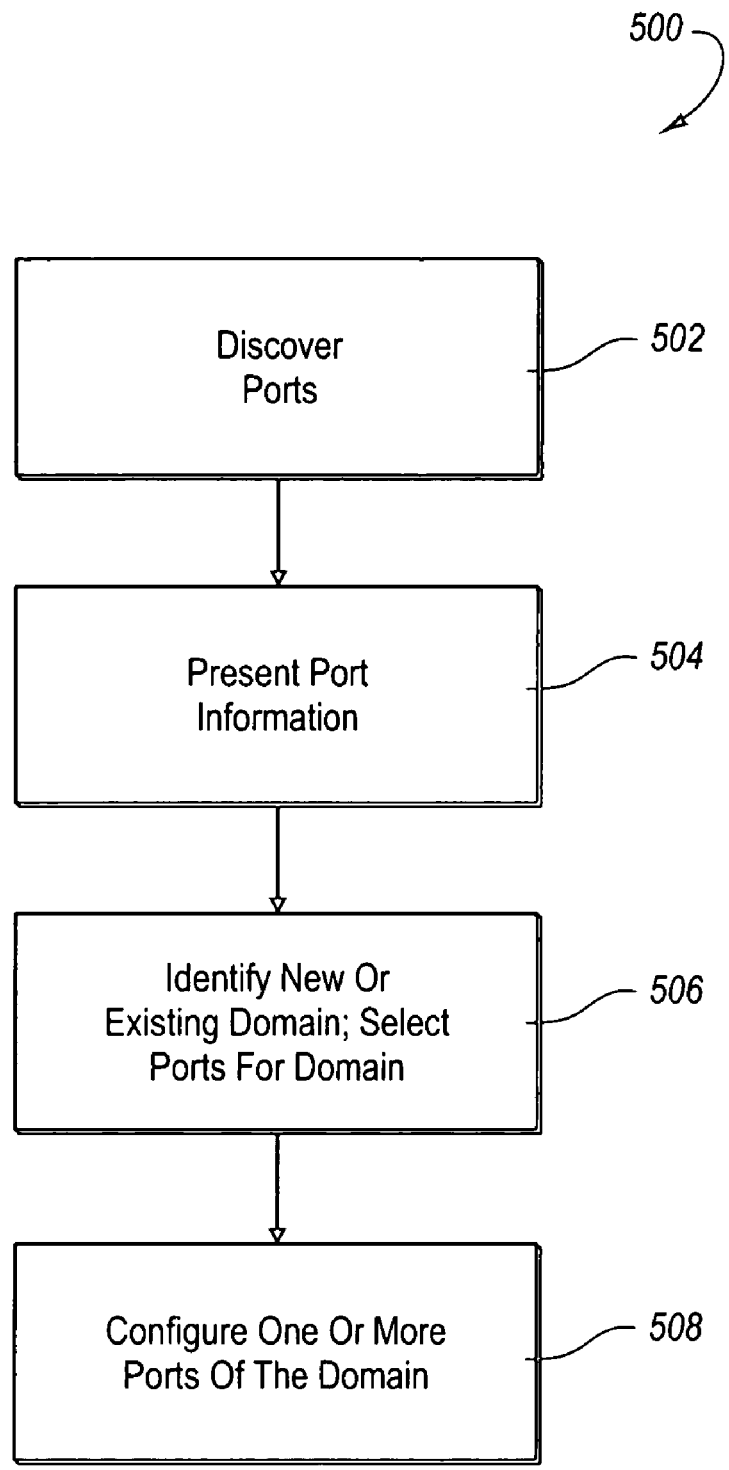
FIG. 5A is a flow diagram of an exemplary process for defining a virtual protocol analyzer.
Figure 5B:
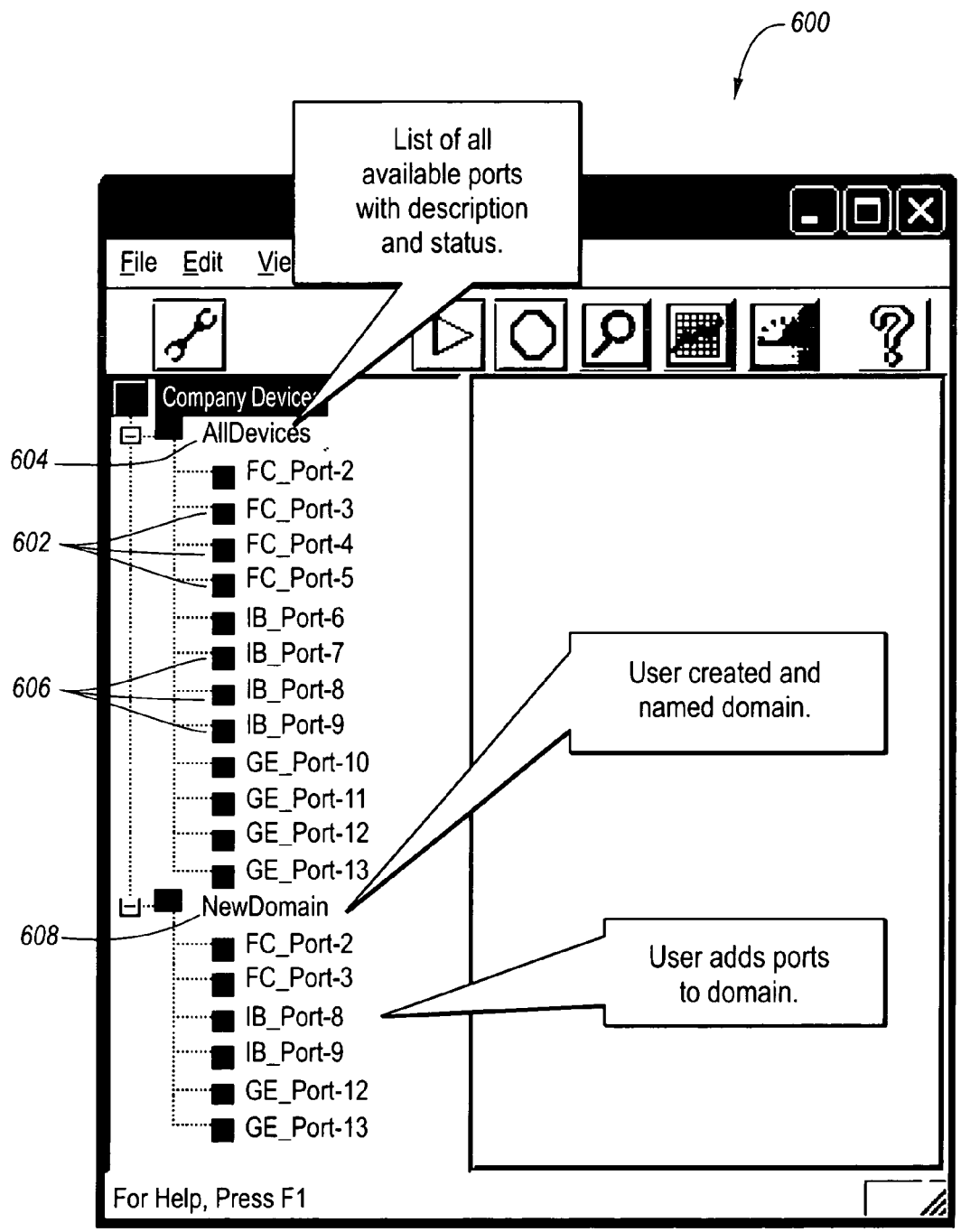
FIG. 5B illustrates an exemplary graphical user interface that displays a list of ports that have been discovered in a protocol analyzer and that is configured to enable a user to reserve a set of ports and create a domain representing a virtual protocol analyzer.
Figure 5C:
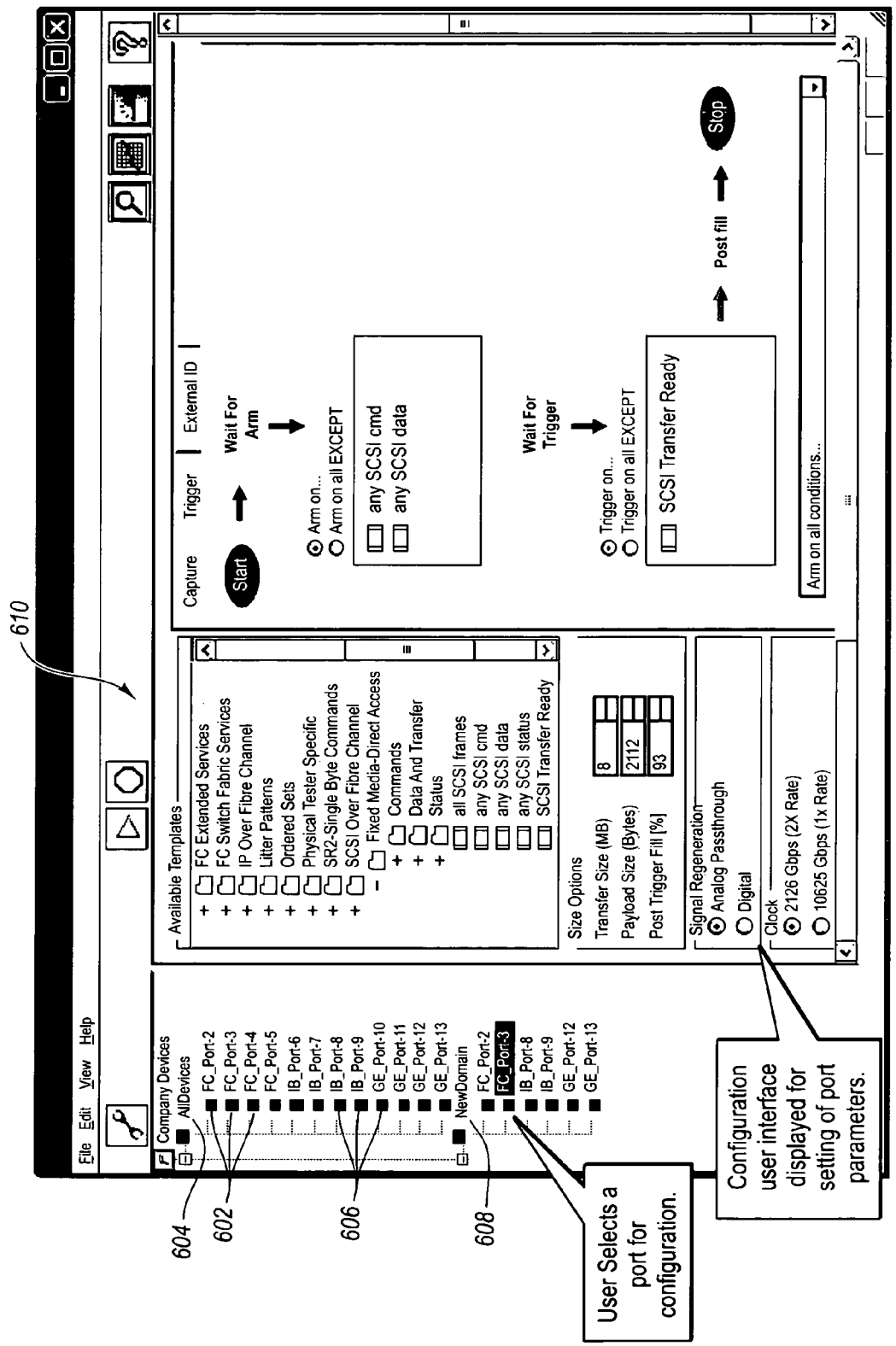
FIG. 5C illustrates an exemplary graphical user interface configured to enable a user to define the operating parameters of the ports in a domain.

With attention now to FIGS. 5A through 5C, details are provided concerning processes for the use of various graphical user interfaces in connection with the creation and modification of domains. Note that while this process is referred to as domain creation, the process is equally well suited to implement changes to existing domains.

A. Port Discovery

As indicated in FIG. 5A, the first stage 502 in the domain creation process 500 is to identify, or discover, the ports of the multi-link protocol analyzer. The user must be able to ascertain what ports are provided in the multi-link protocol analyzer so that decisions can be made as to which ports will be included in a particular domain. The identification of ports can be performed in a variety of different ways, based upon the hardware configuration of the particular multi-link protocol analyzer to be employed in the domain creation. For example, where the multi-link protocol analyzer reflects a bus-based design, as in a PCI card, the ports can be identified by scanning the bus. As another example, in networked instruments, a network based discovery mechanism, such as user datagram protocol ("UDP") broadcasts, can be used to identify the ports of the multi-link protocol analyzer. Any other suitable method of port discovery may be used as well.

Directing particular attention now to FIG. 5B, and with continuing attention to FIG. 5A, the process 500 advances to stage 504 after the ports of the multi-link protocol analyzer have been discovered. At stage 504, a list of the discovered ports and information concerning the ports is presented to the user by way of a graphical user interface ("GUI") 600. In the embodiment of the GUI 600 illustrated in FIG. 5B, all of the discovered ports 602 are displayed together in an interleaved fashion, without regard to the respective native protocols of the ports, under a directory 604 entitled "AllDevices." Of course, the discovered ports may be displayed in various other ways as well.

More generally, the scope of the invention is not limited to any particular implementation, configuration or arrangement of the GUI 600. Rather, embodiments of the GUI may be configured in any way that is consistent with the functionality disclosed herein. Accordingly, the GUI may include a variety of vehicles configured to display information such as, but not limited to, radio buttons, data fields, directory trees, tables and charts. Similarly, embodiments of the GUI likewise include a variety of vehicles or mechanisms configured to receive input from a user, wherein such input may take various forms and may be provided by devices such as a mouse or keyboard. Examples of user input received by way of the GUI 600 include, but are not limited to, selection of radio buttons, entry of information into fields provided by the GUI 600, drag-and-drop actions, and select-copy-paste actions.

For each displayed port, the list includes a description of the port, the associated protocol, and a number that uniquely identifies the port. The identifying number allows the user to relate the listed port to the actual port hardware and can be any type of indicator or information that uniquely describes the associated port. In the illustrated embodiment of the GUI 600, the number assigned to each discovered port corresponds to an associated slot in a bus.

As further indicated in FIG. 5B, the GUI 600 is also configured to present other information concerning the discovered ports. For example, the GUI 600 indicates the communications protocol, such as Infiniband ("IB"), Fibre Channel ("FC") and Gigabit Ethernet ("GE"), associated with each of the ports. Thus, as indicated in FIG. 5B, an exemplary port designation would take the form "FC_Port-5," indicating that this port is configured for the Fibre Channel communications protocol and is associated with slot 5 of a bus.

Another example of information displayed by the GUI 600 concerns the status of each of the ports. Because different ports can be used simultaneously by different users, it is useful for the user to know which ports are available and which are not. To this end, at least some embodiments of the GUI use a color coded icon scheme to indicate the status of a port. In one example, if the icon 606 is green, the port is available for use. If the icon is blue, the port is in use by another user. Finally, if the icon is red, the port hardware is in an error state and cannot be used. Such a color code scheme is but one example of a way in which port status information can be presented to a user. Any other system or indicator of comparable functionality may likewise be employed.

B. Port Selection

With continuing attention to FIGS. 5A and 5B, the process 500 advances to stage 506 after the list of the discovered ports and information concerning the ports is presented to the user. Because the user may need to collect data from several communications links at the same time in order to construct an experiment to diagnose a problem, the GUI 600 receives input, at stage 506, from the user concerning the name of a domain to be created or modified, and the ports that are to be included in the domain. In this way, the GUI 600 enables the user to create a virtual multi-port analyzer, or domain, that includes a collection of ports selected by the user. Thus, the user can readily develop a virtual instrument, or multi-port analyzer, tailored to address a specific problem or matter of interest in the communications network. In some cases, the domain thus created or modified is for the exclusive use of the user who has created the domain. However, some embodiments of the invention permit the creator/modifier of the domain to specify a list of users for the domain.

Moreover, multiple domains can be created at the same time from a collection of non-overlapping ports. From the perspective of the user, a domain appears as a single protocol analyzer in which all of the ports share a trigger line and a common time clock. The protocol analyzer can establish shared trigger lines and time clocks in any of a variety of ways so long as, from the perspective of the user, the selected ports appear to share trigger lines and a common time clock.

With particular attention to FIG. 5B, the illustrated embodiment of the GUI 600 facilitates domain creation and modification by enabling the user to create and name a domain, such as the "NewDomain" 608 indicated, and to add ports to that domain. Alternatively, the user can remove and/or add ports from/to an existing domain.

The GUI 600 can be configured in a variety of different way so as to enable the user to add ports to the domain, and/or remove ports from a domain, in a variety of ways. Accordingly, the scope of the invention is not limited to any particular GUI implementation. For example, some embodiments of the GUI 600 include a drag-and-drop feature by which ports are added to, or removed from, the domain. In particular, the user is able to modify the domain simply by dragging ports from the "AllDevices" list to the domain, or dragging ports from the domain to the "AllDevices" list. In one alternative embodiment, the GUI 600 is configures so that the user can use a select-copy-paste technique to add ports to a domain. As the user adds ports to, or removes ports from, a domain, the change in the configuration of the domain is reflected in the display presented by the GUI 600.

Because domains can be created simply by selecting the ports that are to be included in a desired domain, one or more virtual protocol analyzers can be readily defined and used without necessitating changes to system hardware connections, such as the communications links of the system under test. For example, if a set of links are initially broken and connected to ports of a multi-link protocol analyzer, embodiments of the invention permit multiple users to select from the set of links to create domains. Thus, once the links have been initially instrumented, any analyzer port can be included any number of times into any domain. Such flexibility allows different users to diagnose different problems using different combinations of ports without frequent physical disruption of the links in the system.

C. Port Configuration

Each port in a protocol analyzer may have many different parameters which can be adjusted or changed as necessary to control operational matters such as the type and amount of data to be collected in connection with that port. Accordingly, embodiments of the GUI are configured to enable a user to readily configure, and reconfigure, the ports in a multi-link protocol analyzer. This capability is particularly useful where a single domain includes ports conforming to a variety of different protocols, since multiple port parameter sets must be configured.

Directing particular attention now to FIG. 5C, and with continuing attention to FIG. 5A, exemplary embodiments of the GUI 600 enable a user to configure one or more ports of the domain. Thus, after port selection has been completed, the process 500 advances to stage 508 where the user configures one or more ports of the domain. In some alternative implementations, the user is able to configure ports prior to including those ports in the domain. Generally, a configuration editor section of the GUI 600 displays editable operating parameters, as well as fixed port values and characteristics in some cases, for one or more ports and receives input from the user concerning such parameters.

More particularly, the GUI 600 is configured so that the configuration editor interface 610 changes depending upon the communications protocol supported by the analyzer port. For example, if the user selects a Fibre Channel port, a Fibre Channel configuration editor is displayed as is shown in FIG. 5C. Similarly, if the user selects an Infiniband port for example, an Infiniband configuration editor is displayed by the GUI 600. In this way, the user can effectively and efficiently configure the ports in the domain for operation. It should be noted that the GUI 600 may be constructed for use in connection with a wide variety of other communications protocol types as well.

After the ports of the domain have been configured, the virtual protocol analyzer, or domain, is ready to be used to capture and analyze network data and to display the results. In operation, the ports of the analyzer monitor different links in the system under test. Each port can have different trigger criteria and other settings, including those that have been set using the exemplary graphical user interface illustrated in FIGS. 5B and 5C. When one port triggers, its trigger is propagated to the other ports in the domain, as illustrated in FIG. 2. The ports then capture the network data transmitted on the communications links that interface with the ports. Human-readable data that summarizes the captured data can then be displayed to the user. In general, the methods for discovering the ports of the protocol analyzer and presenting user interfaces that enable the user to create a domain and configure the ports of the domain can be used with any suitable protocol analyzer and with any suitable methods for displaying the results of the protocol analysis.

Thus, exemplary embodiments of, the invention are concerned with a graphical user interface that, among other things, enables a user to quickly and efficiently create domains having multiple ports, which may be associated with different protocols, and to configure the ports in the domain. The resulting virtual protocol analyzer appears, from the perspective of the user, to be a dedicated protocol analyzer that shares a trigger lines and a common clock. The domain can be reconfigured by the same or different users as needed to prepare the domain for use with different sets of communications links in the system under test.

IV. Computing Environments, Hardware and Software

In at least some cases, some or all of the functionality disclosed herein may be implemented in connection with various combinations of computer hardware and software. For example, at least some protocol analyzers use hard coded devices such as field programmable gate arrays ("FPGA") to implement timestamping, data sorting and data capture functionality. Other protocol analyzers employ both hardware and software to implement various functions disclosed herein.

With respect to computing environments and related components, at least some embodiments of the present invention may be implemented in connection with a special purpose or general purpose computer that is adapted for use in connection with communications systems. Embodiments within the scope of the present invention also include computer-readable media for carrying or having computer-executable instructions or electronic content structures stored thereon, and these terms are defined to extend to any such media or instructions that are used with telecommunications devices.

By way of example such computer-readable media can comprise RAM, ROM, EEPROM, CD-ROM or other optical disk storage, magnetic disk storage or other magnetic storage devices, or any other medium which can be used to carry or store desired program code in the form of computer-executable instructions or electronic content structures and which can be accessed by a general purpose or special purpose computer, or other computing device.

When information is transferred or provided over a network or another communications connection (either hardwired, wireless, or a combination of hardwired or wireless) to a computer or computing device, the computer or computing device properly views the connection as a computer-readable medium. Thus, any such a connection is properly termed a computer-readable medium. Combinations of the above should also be included within the scope of computer-readable media. Computer-executable instructions comprise, for example, instructions and content which cause a general purpose computer, special purpose computer, special purpose processing device such as a link analyzer or multi-link protocol analyzer, or computing device, to perform a certain function or group of functions.

Although not required, aspects of the invention have been described herein in the general context of computer-executable instructions, such as program modules, being executed by computers in network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. A method that is suitable for use in connection with a multi-protocol communications analyzer, and the method comprising:
   identifying by a multi-protocol communications analyzer ports of the multi-protocol communications analyzer;
   determining whether one or more of the identified ports are available;
   using at least one of any available ports to at least partially define a domain;
   configuring at least one port of any domain that was defined in connection with an available port; and
   modifying any domain that was at least partially defined in connection with an available port;
   wherein the domain is defined such that ports included in the domain appear to share, from a first user perspective, a trigger line and a common clock;
   wherein modifying any domain that was at least partially defined in connection with an available port comprises changing the number of ports associated with the domain;
   wherein at least a portion of the method is performed by way of a graphical user interface.

2. The method as recited in claim 1, wherein the domain, if any domain was defined, comprises one of: a modified version of a previously existing domain; a new domain.

3. The method as recited in claim 1, further comprising displaying information concerning the ports of the multi-protocol communications analyzer.

4. The method as recited in claim 1, further comprising displaying information concerning availability of the ports of the multi-protocol communications analyzer.

5. The method as recited in claim 1, further comprising displaying information concerning a domain.

6. The method as recited in claim 1, further comprising displaying information concerning port parameters.

7. The method as recited in claim 1, further comprising receiving one of: a domain creation request; a domain modification request.

8. The method as recited in claim 7, further comprising receiving and displaying the name of the domain that is the subject of the received request.

9. The method as recited in claim 1, further comprising receiving port selection input if a port has been determined to be available.

10. The method as recited in claim 1, further comprising receiving port configuration input if a domain has been at least partially defined in connection with an available port.

11. The method as recited in claim 1, further comprising displaying port configuration information if a domain has been at least partially defined in connection with an available port.

12. The method as recited in claim 1, wherein determining whether one or more of the identified ports are available includes determining whether the one or more identified ports are reserved for use by a second user.

13. The method as recited in claim 1, wherein determining whether one or more of the identified ports are available includes determining whether the one or more identified ports are in an error state.

14. The method as recited in claim 1, wherein the at least one of any available ports used to at least partially define the domain includes a port pair that captures data transmitted on a bi-directional communications link in a communications system.

15. A method for defining a domain in a multi-protocol communications analyzer, and the method comprising:
   identifying by a multi-protocol communications analyzer ports of link analyzers in the multi-protocol communications analyzer;
   determining whether one or more of the identified ports are available;

using at least one of any available ports to at least partially define a domain; and configuring at least one port of any domain that was defined in connection with an available port, wherein a first one of the link analyzers in the multi-protocol communications analyzer is configured for use with a data stream corresponding to a first communication protocol and a second one of the link analyzers is configured for use with a data stream corresponding to a second communication protocol;

wherein the first link analyzer is configured to propagate a trigger and clock signal that is received by the first link analyzer to the second link analyzer;

wherein at least a portion of the method is performed by way of a graphical user interface.

16. The method as recited in claim 15, wherein the first link analyzer is further configured to propagate the trigger and clock signal to a third one of the link analyzers.

17. The method as recited in claim 16, wherein the first, second, and third link analyzers are arranged such that the trigger and clock signal is propagated serially to the second and third link analyzers.

18. The method as recited in claim 16, wherein the first, second, and third link analyzers are arranged such that the trigger and clock signal is propagated in parallel to the second and third link analyzers.

19. The method as recited in claim 15, wherein the at least one of the first and second link analyzers is interchangeable with a link analyzer configured for use with a data stream corresponding to a third communication protocol.

* * * * *